(12) United States Patent
Finizole E Silva et al.

(10) Patent No.: US 9,240,972 B2
(45) Date of Patent: Jan. 19, 2016

(54) METHOD TO IMPROVE THE REGISTRATION OF <PERMANENTLY REGISTERED USERS> IN AN NGN-IMS SUBSYSTEM

(75) Inventors: Leonardo Finizole E Silva, Antwerp (BE); Hugo Verbandt, Merksem (BE)

(73) Assignee: Alcatel Lucent, Boulogne-Billancourt (FR)

( * ) Notice: Subject to any disclaimer, the term of this patent is extended or adjusted under 35 U.S.C. 154(b) by 2050 days.

(21) Appl. No.: 11/775,681

(22) Filed: Jul. 10, 2007

(65) Prior Publication Data

US 2008/0261592 A1    Oct. 23, 2008

(30) Foreign Application Priority Data

Aug. 23, 2006    (EP) ..................................... 06291355

(51) Int. Cl.
   *H04W 4/00*      (2009.01)
   *H04L 29/12*     (2006.01)
   *H04L 29/06*     (2006.01)

(52) U.S. Cl.
   CPC ...... *H04L 61/1588* (2013.01); *H04L 29/12094* (2013.01); *H04L 29/12188* (2013.01); *H04L 61/1529* (2013.01); *H04L 65/103* (2013.01); *H04L 65/104* (2013.01); *H04L 65/1073* (2013.01); *H04L 65/1016* (2013.01)

(58) Field of Classification Search
   CPC ...................................................... H04W 4/00
   USPC ...................................................... 455/435.1
   See application file for complete search history.

(56) References Cited

U.S. PATENT DOCUMENTS

| | | | | |
|---|---|---|---|---|
| 7,634,249 | B2 * | 12/2009 | Hahn et al. | 455/403 |
| 7,724,753 | B2 * | 5/2010 | Naqvi et al. | 370/410 |
| 2006/0206504 | A1 * | 9/2006 | Cai et al. | 707/100 |
| 2007/0055874 | A1 * | 3/2007 | Phan-Anh et al. | 713/168 |
| 2007/0177603 | A1 * | 8/2007 | Calme et al. | 370/395.2 |

FOREIGN PATENT DOCUMENTS

| | | | |
|---|---|---|---|
| GB | 2419774 | * | 5/2006 |
| GB | 2419774 A | | 5/2006 |

OTHER PUBLICATIONS

"Digital cellular telecommunications system (Phase 2+); Universal Mobile Telecommunications System (UMTS); IP Multimedia Subsystem (IMS); Stage 2 (3GPP TS 23.228 version 7.2.0 Release 7)", ETSI TS 123 228 V7.2.0, Dec. 2005, XP014032467.

* cited by examiner

*Primary Examiner* — Huy C Ho
(74) *Attorney, Agent, or Firm* — Harness, Dickey & Pierce, P.L.C.

(57) ABSTRACT

A method to improve the registration of "Permanently Registered Users" (User1, User2, . . . User500) in an NGN-IMS subsystem. The permanently registered users are coupled to the IMS subsystem via a group device (AGW1, IP-PBX, SIP/H.323 GW) that is registered in the IMS subsystem as a dedicated IMS virtual user by means of its IMPI/IMPU identifier. The HSS/UPSF server is then allowed to download the user profiles in bulk. This results in fewer loads on the IMS and in a shortened start-up time of the group device(s).

11 Claims, 1 Drawing Sheet

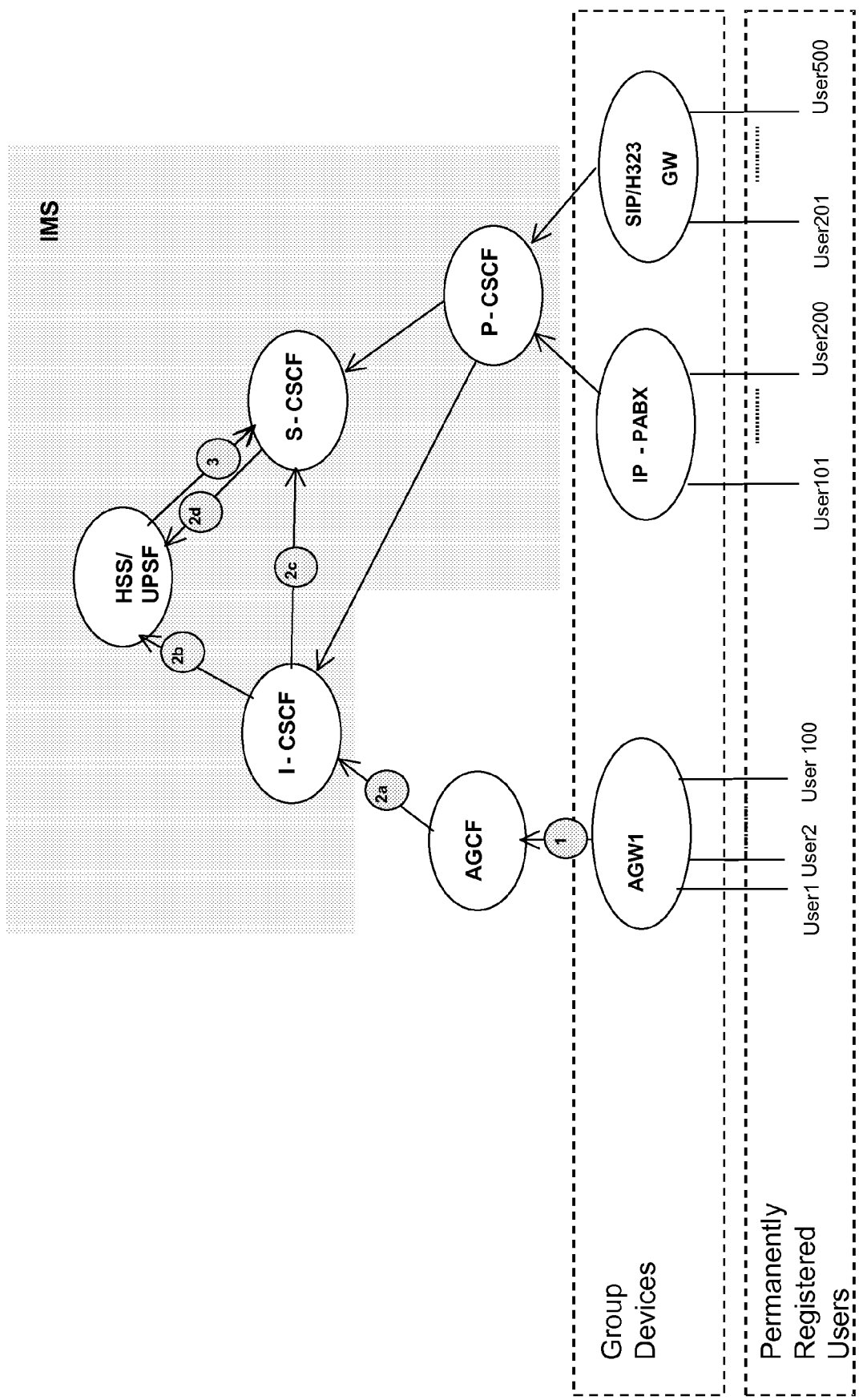

METHOD TO IMPROVE THE REGISTRATION OF <PERMANENTLY REGISTERED USERS> IN AN NGN-IMS SUBSYSTEM

The present invention relates to a method for the registration of a plurality of Permanently Registered Users in an IMS subsystem (IP Multimedia Subsystem) of an NGN system (Next Generation Network), said permanently registered users being coupled to said IMS subsystem via a group device.

Within the telecommunication domain of public switching, the $2^{nd}$ generation of TDM (Time Division Multiplexed) based Public Switching Telecommunication Networks (PSTN) for the fixed public telecommunication networks and Public Land Mobile Networks (PLMN) for the mobile telecommunication networks, is evolving towards $3^{rd}$ generation IP based Next Generation Networks (NGN).

Within the scope of $3^{rd}$ generation mobile telecommunication network evolution, ETSI-3GPP standardization defines the network architecture. Within the 3GPP network architecture there is a split between the (mobile) access part and the so-called IP Multimedia Subsystem (IMS) layer. The IMS layer deals with the control of conversational multimedia sessions as well providing access towards applications. This IMS layer is access independent.

Within the scope of $3^{rd}$ generation fixed telecommunication networks, ETSI-TISPAN reuses the architecture work done by 3GPP for IMS and extends the architecture with the requirements for fixed access.

Within the domain of fixed access there exist 2 types of users from an IMS perspective:
  Native SIP (Session Initiation Protocol) users: that have to register individually to the IMS. This is the use case currently being defined in 3GPP; and
  Groups of users: that are assumed to be registered permanently in case of the "group device" registers to the IMS. The users do not register themselves because of the nature of their terminal, e.g. a classical Plain Old Telephony System (POTS) or because of the characteristics of the gateway they are connected to (a legacy SIP/H.323). Following types of accesses are included:
    POTS (Plain Old Telephony System) users behind a centralized access gateway (controlled by e.g. H.248/Megaco);
    Users behind an IP-PABX (IP —Private Access Branch Exchange);
    Users behind legacy SIP/H.323 gateways; or
    Any other kind of grouping Known NGN IMS subsystem provides a generic SIP centric call session control layer, independent from the access technology below. Every user attached to the IMS is assumed to register individually to the IMS. Moreover, there will be periodically (e.g. once every hour) re-registration sequences for every registered user.

In case of users are connected by means of, e.g., a gateway to the IMS, the current IMS architecture assumes that all users, identified by means of IMS Private user Identity/IMS Public user Identity (IMPI/IMPU), behind this gateway have to register individually to the IMS.

As the end-users may have only classical POTS phones or due to the fact that only the gateway registers to the IMS (e.g. a legacy H.323 gateway), they can NOT register themselves, but it is up to either the Access Gateway Control Function (AGCF) or Proxy —Call Session Control Function (P-CSCF) to register all the users at once in case of a GW registers.

For large gateways, comprising thousands of terminations, this would mean the parallel sending of thousands of registration sequences (and subsequently the downloading of thousands of profiles).

This may affect the service quality (overload, rejection of sessions, etc.) offered by the IMS network.

An object of the present invention is to improve the above known method for the registration of such "permanently registered users".

According to the invention, this object is achieved due to the fact that said method comprises the step of registering said group device in said IMS subsystem as a dedicated IMS virtual user.

The inventive concept is to treat in IMS. The group device is treated as a dedicated IMS virtual user identified by means of an IMPI and IMPU. The virtual IMS user groups all IMS users (IMPI/IMPU) connected to this group device.

It is to be noted that the concept of group device registration should not be confused with the implicit registration concept of IMS. Implicit registration is done on the basis of a subscription (contract) while the group device registration is done at the basis of a piece of equipment owned by the network operator (to which multiple subscriptions are associated, each of these subscriptions may be associated to one or more Implicit Registration Sets (IRS).

Another characterizing embodiment of the present invention is that said group device is configured in a HSS/UPSF server (Home Subscriber Server/User Profile Server Function) of said IMS subsystem by means of an IMPI/IMPU identifier.

In this way, the virtual IMS user is provided as a new object inside the HSS.

Moreover, after successful registration of said group device, said HSS server registers the IMPI/IMPU identifiers of each permanently registered user coupled to said group device.

In this way, a group of permanently registered users are automatically registered within IMS after the group device registers successfully to the IMS.

Also another characterizing embodiment of the present invention is that said HSS/UPSF server downloads user profiles of said permanently registered users to a S-CSCF (Serving —Call Session Control Function) of said IMS system after the successful registration of the group device.

In this way, there are fewer loads on the IMS (S-CSCF/I-CSCF/HSS/Application Server). Additionally, the start-up time of group device(s) is shortened.

In a preferred characterizing embodiment of the present invention, said HSS server downloads said user profiles in bulk.

After a successful registration of the group device, the HSS/S-CSCF will register automatically all associated IMPI/IMPU and HSS/UPSF will download the associated user profiles to the S-CSCF in bulk. As a group device may comprise several thousands of users (e.g. 5000), the HSS/UPSF will download the users in chunks (e.g. 50 messages containing each 100 user profiles).

Yet another characterizing embodiment of the present invention is that a said permanently registered user is a user behind a IP-PABX (Internet Protocol—Private Access Branch Exchange), wherein said IP-PABX is said group device.

Also other characterizing embodiments of the present invention are that said group device is an Access Gateway or a legacy SIP/H.323 gateway (Session Initiation Protocol gateway).

Further characterizing embodiments of the present method are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein the FIGURE represents an NGN IMS Subsystem operating according to the method of the present invention.

The FIGURE shows the 3GPP IMS subsystem (IP Multimedia Subsystem) of an NGN Network (Next Generation Network). The IMS is composed of a HSS/UPSF (Home Subscriber Server/User Profile Server Function), a S-CSCF (Serving-Call Session Control Function), a I-CSCF (Interrogating-Call Session Control Function) and P-CSCF (Proxy—Call Session Control Function). The IMS is coupled to "Permanently Registered Users" User1, User2, . . . , User500 via a set of group devices that are attached to the IMS.

A group device may for instance be an Access GateWay AGW1, an IP-Private Access Branch Exchange IP-PABX or a legacy Session Initiation Protocol gateway such as SIP/H323 GW.

Permanently Registered Users, also called "Always ON Users" are users assumed to be registered permanently in case of the group device registers to the IMS. The users do not register themselves because of the nature of their terminal, e.g. a classical Plain Old Telephony System (POTS) or because of the characteristics of the gateway they are connected to (a legacy SIP/H.323). Following types of accesses are included:

POTS (Plain Old Telephony System) users behind a centralized access gateway (controlled by, e.g., H.248/Megaco);

Users behind an IP-PABX;

Users behind legacy SIP/H.323 gateways; or

Any other kind of grouping.

As an example of group device we hereafter highlight the scenario for an access gateway device AGW1 connected to an Access Gateway Control Function AGCF.

The HSS/UPSF keeps information about the group device AGW1 as a dedicated virtual IMS user, as well as all the associated permanently registered users User1 till User100 coupled to AGW1.

When the AGW1 initializes it sends (1) a service change request, e.g. a H.248 Service change, to the AGCF indication that all terminals associated with user1 till user100 are available.

The AGCF then initiates a SIP registration on behalf of the group device AGW1 and sends (2a) a registration request to the I-CSCF indicating the IMS Private user Identity IMPI and the IMS Public user Identity IMPU associated with AGW1.

The I-CSCF requests (2b) the HSS/UPSF to pass the information (preferred CSCF or capabilities) in order to select the S-CSCF instance to which the AGW1 will have to register. All the users belonging to the same group device have to be registered at the same S-CSCF instance.

The I-CSCF passes (2c) the registration request the selected S-CSCF instance.

After authentication (not necessary for some of the group devices), the S-CSCF sends (2d) a Server Assignment Request to the HSS/UPSF indicating the group device AGW1 is now assigned to the S-CSCF.

The HSS/UPSF downloads (3) all associated user profiles in bulk to the S-CSCF within a Server Assignment Answer (SAA not shown). Depending on the total number of users to be downloaded there may be one or more SAA messages.

No $3^{rd}$ party application server registration is performed for the permanently registered users.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A method for registering a plurality of permanently registered users in an IP Multimedia Subsystem (IMS) of a Next Generation Network (NGN) system, said plurality of permanently registered users being coupled to said IMS subsystem via a group device ,comprising:

registering said group device in said IMS subsystem as a dedicated IMS virtual user; and registering in parallel, by the group device, the plurality of permanently registered users in said IMS subsystem upon registering said group device.

2. The method according to claim 1, wherein said group device is configured in said IMS subsystem by means of an IMS Private user Identity/IMS Public user Identity (IMPI/IMPU) identifier.

3. The method according to claim 2, wherein said group device is configured in a Home Subscriber Server/User Profile Server Function (HSS/UPSF) server of said IMS subsystem.

4. The method according to claim 3, wherein after successful registration of said group device, said HSS/UPSF server registers the IMPI/IMPU identifiers of each permanently registered user coupled to said group device.

5. The method according to claim 4, wherein said HSS/UPSF server downloads user profiles of said permanently registered users to a Serving-Call Session Control Function (S-CSCF of said IMS system after the successful registration of the group device.

6. The method according to claim 5, wherein the HSS/UPSF server downloads said user profiles in bulk.

7. The method according to claim 1, wherein at least one of said permanently registered users is a Plain Old Telephony System (POTS) user.

8. The method according to claim 1, wherein at least one of said permanently registered users is a user behind a IP-Private Access Branch Exchange (IP-PABX), wherein said IP-PABX is said group device.

9. The method according to claim 1, wherein said group device is controlled by a standard protocol.

10. The method according to claim 1, wherein said group device is an Access Gateway.

11. The method according to claim 1, wherein said group device is a legacy gateway.

\* \* \* \* \*